United States Patent Office 3,414,700
Patented Dec. 3, 1968

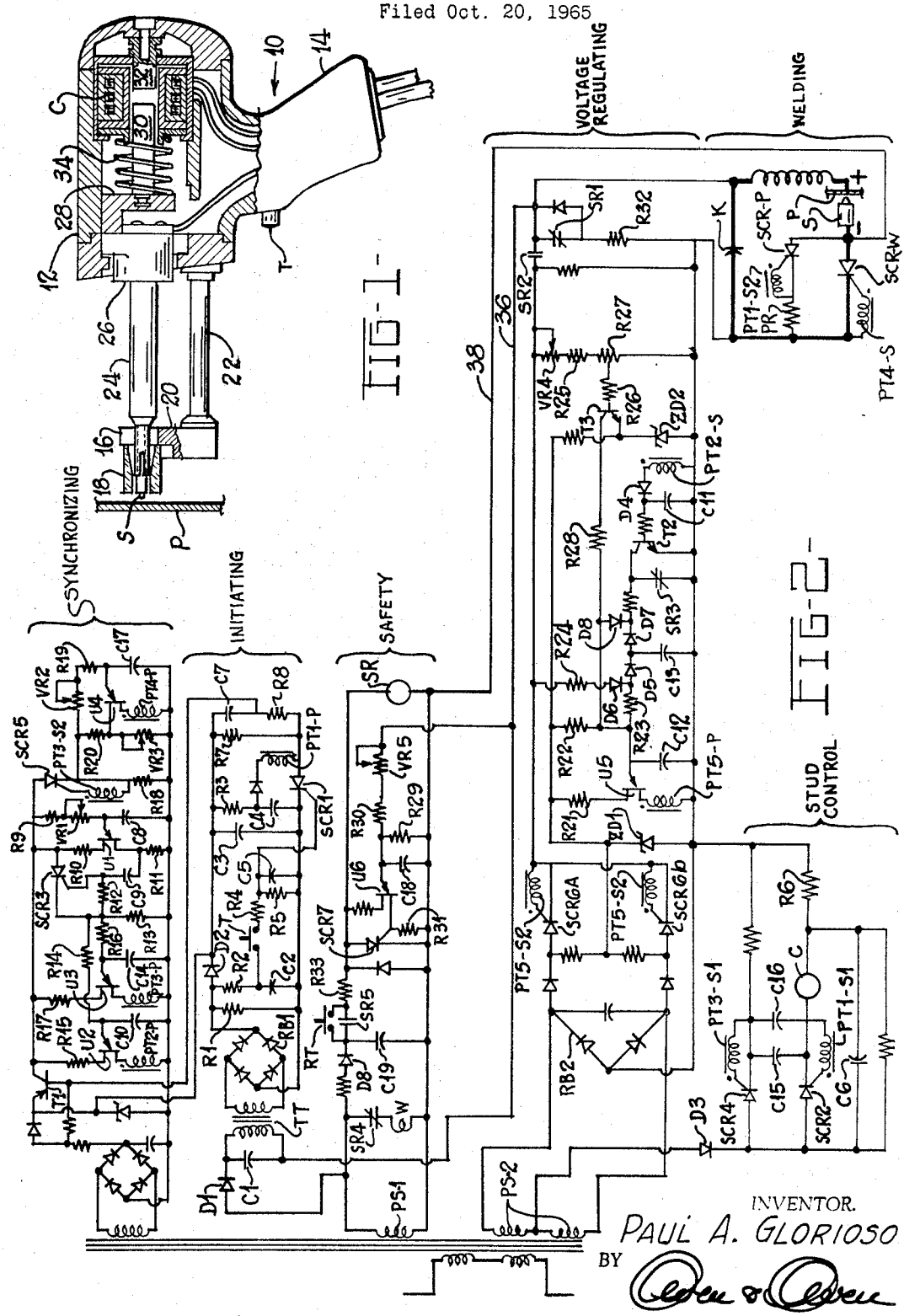

3,414,700
WELDING STUDS TO WORKPIECES
Paul A. Glorioso, Amherst, Ohio, assignor to Gregory Industries, Inc., Lorain, Ohio, a corporation of Michigan
Filed Oct. 20, 1965, Ser. No. 498,802
11 Claims. (Cl. 219—98)

ABSTRACT OF THE DISCLOSURE

A stud welding circuit employs a capacitive power source and is capable of producing an extended pilot arc. The main power source which charges the capacitive power source also is connected across the stud and workpiece during the pilot arc to provide power for the pilot arc and prevent undue drain on the capacitive power source. The main power source is then disconnected from the capacitive power source prior to the initiation of the main welding arc, the power for which is supplied from the capacitive power source.

---

This invention relates to stud welding and particularly to means for welding a stud to a workpiece with the use of an extended pilot arc and with solid state controls.

In a welding cycle for end welding a stud to a workpiece, a stud is first pressed against the workpiece to obtain good electrical contact therebetween and the welding cycle is then initiated when a trigger of the welding tool is pulled. The stud thereby is retracted from the workpiece and a pilot arc is substantially simultaneously established between the stud and the workpiece. The stud is then held at a predetermined distance from the workpiece and a main welding arc is subsequently initiated between the stud and the workpiece. The stud then is plunged toward and against the workpiece to unite the two pieces and complete the weld. As discussed in my patent application Ser. No. 732,764, the timing between the plunge stroke of the stud and the establishment of the main welding arc is important and this is particularly true when the source of welding power is a capacitor which discharges in a very brief period of time and thereby produces a welding arc of short duration. If the welding arc is initiated too late, a dead short will occur between the stud and the workpiece at the end of the plunge, and the full welding power will not be utilized, with a weak weld resulting. On the other hand, if the welding arc is initiated too early, the molten metal formed thereby will solidify before the stud and workpiece are brought into contact so that, again, a weak weld or no weld at all will be made. The timing depends on such factors as the type of power source used, the particular type of welding tool employed, the size and shape of the stud, the nature of the metal from which it is made, and the size, thickness, and material of the workpiece.

It has been found that a longer or extended pilot arc can be instrumental in producing a stronger, improved weld on certain types of metal. For example, on galvanized metal, and particularly if it has an oily surface, a more effective and stronger weld can be achieved by extending the length of the pilot arc to several times its usual duration.

Heretofore, it has been common practice to use the same source of power for the pilot arc as for the main welding arc. When a capacitor is used for the main source of power, as disclosed in my Patent 3,136,880, the pilot arc necessarily drains the capacitor power source slightly prior to the initiation of the main welding arc. The decrease in voltage, however, previously has not been sufficient to be significant. It has been discovered, however, that with an extended pilot arc the drain on the capacitor power source can be substantial to the point of weakening the main welding arc. For example, a 110 volt charge on a capacitor power source may be drained to 70 volts by the extended pilot arc, prior to the initiation of the main welding arc.

In accordance with the invention, the power for the pilot arc can be taken from the main power source used to charge the welding power source or capacitor, either directly or by maintaining the welding power source connected across the main power source while the pilot arc persists. In this manner, the charge on the welding power source is substantially unchanged from that existing before the main welding arc is initiated. Substantially at or prior to the initiation of the main welding arc, the welding power source is disconnected from the main power source. The circuitry enabling these results to be achieved also provides a unique electrical arrangement for initiating the welding cycle, using entirely solid state components without any relays whatsoever.

It is, therefore, a principal object of the invention to provide a method and apparatus for welding a stud to a workpiece with the use of an extended pilot arc, the length of which can be adjustably controlled, and which pilot arc does not decrease the voltage of the welding power source for the main welding arc.

Another object of the invention is to provide a method and apparatus for welding studs to a workpiece with the use of a capacitor power source for the main welding arc and with an extended pilot arc operated through a main power source to prevent draining of the capacitor.

Still another object of the invention is to provide an electrical control circuit for a welding tool which includes an entirely solid state initiating circuit.

Many other objects and advantages of the invention will be apparent from the following detailed description of a preferred embodiment thereof, reference being made to the accompanying drawing, in which:

FIG. 1 is a schematic view in vertical cross section of a typical welding tool with which an electrical circuit embodying the invention is employed; and FIG. 2 is a diagrammatic view of the electrical welding circuit.

Referring to FIG. 1, a welding tool 10 can be of a number of suitable types and essentially includes means for retracting a stud from a workpiece and means for moving the stud toward and against the workpiece. In the specific form shown, the welding tool 10 includes a main body 12 including a pistol grip 14 with a starting or initiating trigger T. A chuck 16 at the front of the tool holds a stud S during the welding cycle with the chuck being surrounded, in this instance, by a permanent spark shield 18. The spark shield 18 is attached to a welding foot 20 which is adjustably supported by two legs 22. A frangible ceramic ferrule can be used in place of the spark shield and in some applications, no shield or ferrule at all may be needed.

The chuck 16 is attached to a chuck leg 24 which is electrically connected to a main welding cable clamp 26. A rear cable clamp part 28 is attached to the rear of the clamp 26 and is fastened to a lifting rod or core 30 extending into a lifting coil C. The core is retracted when current is supplied to the coil C through suitable leads extending through the grip 14 of the tool. The core is retracted until it contacts an adjustable stop 32 which determines the extent of the lift of the stud S from a workpiece or plate P. When the current to the coil C is shut off, a plunge spring 34 plunges the stud S against the workpiece P. This is done after a main welding arc has been established between the stud and the workpiece for a sufficient time to form molten metal which solidifies to complete the weld after the stud contacts the workpiece.

Referring more particularly to FIG. 2, the circuitry for initiating the welding cycle will be discussed first. When the stud S is in the chuck and is in contact with the workpiece P, an electrical path is completed through lines 36 and 38 to connect a secondary winding PS–1 of a main power source PS to a tuned transformer TT. A diode D1 prevents current from the welding circuit from flowing through the primary winding of the transformer TT. A capacitor C1 across the primary tunes the resonant frequency of the transformer TT to obtain full-wave output. If the diode D1 were not required, the capacitor C1 would then not be needed because the diode D1 alone would provide half-wave rectification of the AC current. A full-wave rectifier bridge RB1 then provides fully rectified current for the initiating circuitry. A resistor R1 establishes a load resistance for the bridge with a capacitor C2 being charged to the potential of the bridge according to the value of a resistor R2. A third capacitor C3 is charged to the potential of the bridge with a diode D2 preventing the capacitor C3 from discharging back through the capacitor C2 if the stud and workpiece are brought into contact and then are separated, the capacitor C3 having a much larger capacitance than the capacitor C2. A capacitor C4 and a resistor R3 are in parallel with the capacitor C3 and the capacitor C4 is charged to a corresponding value. This is the status of the initiating circuit when the stud and workpiece are brought into contact and before the trigger T is pulled and the contacts closed.

With the trigger contacts closed, the capacitor C2 is connected to the gate of a first silicon controlled rectifier SCR1 with the capacitor C2 then keying or firing the rectifier. A resistor R4 in series with the capacitor C2 limits the discharge current thereof. A resistor R5 and a capacitor C5 protect the rectifier SCR1 against transients and false firing. The values of the resistor R5 and the resistor R2 are selected so that if the trigger T is pulled before the capacitor C2 has become fully charged, the capacitor C2 will simply discharge through the resistor R5 and will not fire the rectifier SCR1.

In the event that the stud is touched to the workpiece and removed before the trigger is pulled, the capacitors C3 and C4 will remain charged but the capacitor C2 will discharge through the resistors R2 and R1. Consequently, the welding cycle cannot be initiated after the stud is removed from the workpiece because there will be no charge to fire the rectifier SCR1 even if the trigger is subsequently pulled. Therefore, it is not possible for a large potential to be established between the stud and the workpiece.

Further, the welding cycle cannot be initiated if the stud is touched to the workpiece after the trigger is pulled. In that event, the capacitor C2 will never become charged initially since the current will be diverted through the resistors R2 and R4, and the resistor R5 and the capacitor C5. In practice, the capacitor C2 has a very brief time constant so that chances that the above-discussed functions will not occur as predicted are virtually nil.

When the proper sequence of operations has been completed, namely contacting the stud and workpiece and then pulling the trigger T, whereby the rectifier SCR1 is keyed, the capacitor C4 discharges through a primary winding PT1–P of a first pulse transformer. Pulsing of this transformer causes the stud to begin to retract from the workpiece and causes a pilot arc to be established between the stud and the workpiece. To accomplish this, a second silicon controlled rectifier SCR2 in the stud control circuit is in circuit with the lifting coil C. When secondary PT1–S1 of the pulse transformer PT1 is pulsed, it keys the rectifier SCR2 and renders it conducting. A capacitor C6 then partially discharges across the coil C and pulls in the core 30 of the tool, retracting the stud. The capacitor C6 discharges only partially, to a certain fraction of its original charge, because of a resistor R6 in series with the coil C. Since only a fraction of the power is required to hold in the coil C after it is first energized, the remaining charge on the capacitor C6 is sufficient to do this and the coil is held in without the excess heating which otherwise is incurred with constant power across the coil. Further, fewer problems occur when the coil is turned off since, with the full voltage across the coil, some of the silicon controlled rectifiers tend to be turned back on and occasionally are turned back on when the coil is turned off. Also, smaller silicon controlled rectifiers can be used. For example, by using the capacitor C6 to energize the coil C, only 400 volt silicon controlled rectifiers can be used in some instances in place of 600 volt silicon controlled rectifiers otherwise required when the coil C is energized by continuous full power. A capacitor is required in any event across the silicon controlled rectifier SCR2 in order to hold it in after being keyed by the pulse from the secondary PT1–S1 so that the capacitor C6 represents little, if any, additional cost. A diode D3 prevents the capacitor C6 from discharging back into the secondary windings of the power source PS.

Along with the secondary winding PT1–S1, another secondary winding PT1–S2 of the pulse transformer is simultaneously pulsed, this winding being located in the welding circuit and specifically in a pilot arc circuit thereof. Pulsing of the secondary PT1–S2 causes a silicon controlled rectifier SCR–P to conduct and thereby establish a pilot arc circuit between the stud S and the workpiece P and a main welding capacitor K which constitutes the welding power source. This circuit is established through a pilot arc resistor PR which limits the power for the pilot arc and the intensity thereof. The pilot arc is initiated substantially as the stud begins to retract since the two operations are initiated substantially simultaneously by virtue of the two secondaries of the first pulse transformer.

When the rectifier SCR1 is keyed, the capacitor C3 begins to discharge through a resistor R7 and through the rectifier SCR1 to maintain it keyed or conducting as long as there is voltage in the capacitor C3. This is long enough to assure completion of a welding cycle. The voltage across the resistor R7 is coupled to the base of a transistor T1 in the synchronizing circuit through a resistor R8. A capacitor C7 produces a time lag in turning on or energizing the transistor T1 after the keying of the rectifier SCR1 so that the synchronizing circuit is rendered operative, as determined by the transistor T1, after the keying of the silicon controlled rectifier SCR1. At this time, a capacitor C8 begins to charge at a rate determined by a fixed resistor R9 and a variable resistor VR1. The latter can be manually controlled to determine the length of the pilot arc. When the charge on the capacitor C8 reaches a value such that the intrinsic standoff ratio of a first unijunction transistor U1 is exceeded, the unijunction transistor is fired. Resistors R10 and R11 provide the proper operating bias for the unijunction transistor. A capacitor C9 couples the voltage across the resistor R11, when the unijunction transistor U1 is fired, to the gate of a third silicon controlled rectifier SCR3 and keys it. A resistor R12 provides the proper loading for the gate and a resistor R13 provides a holding current path for the rectifier SCR3 to prevent it from turning off when the capacitor C8 or C9 is discharged.

When the silicon controlled rectifier SCR3 is keyed, a capacitor C10 begins to charge and fires a second unijunction transistor U2, when the stand-off ratio is exceeded, to discharge through a primary PT2–P of a second pulse transformer. A resistor R14 limits the voltage to the capacitor C10 and a resistor R15 provides proper bias for the unijunction transistor U2. This pulse transformer causes the voltage regulating circuit to be isolated from the welding capacitor K, the two being previously connected as soon as the power source PS was rendered operative. The isolation of the voltage regulating circuit from the capacitor K occurs prior to the initiation of the main welding arc but after the pilot arc has persisted for at least a substantial part of its predetermined period. The period of time in which the voltage regulating circuit is connected to the capacitor K during the existence of the pilot arc is determined by the sum of the delays caused by the capacitor C7, the combination of the capacitor C8 and the unijunction transistor U1, and the combination of the capacitor C10 and the unijunction transistor U2.

To isolate the voltage regulating circuit, the primary PT2–P induces a pulse in a secondary PT2–S in the voltage regulating circuit. The pulse of the secondary is rectified by a diode D4 and filtered by a capacitor C11 and the DC voltage is coupled to the base of a second transistor T2, energizing it. This causes the voltage regulating circuit to be reset and turned off by discharging capacitors C12 and C13 in the voltage regulating circuit. The voltage regulating circuit will be discussed subsequently.

A predetermined period of time after the second pulse transformer has been pulsed, a third one is pulsed in the synchronizing circuit. Accordingly, a capacitor C14 begins to charge through a resistor R16 at the same time that the capacitor C10 begins to charge, but at a slower rate, so as to key a third unijunction transistor U3 a predetermined period of time after the keying of the unijunction transistor U2 and the pulsing of the primary PT2–P. When the third unijunction transistor is keyed, it energizes a primary PT3–P of a third pulse transformer. The unijunction transistor U3 also is connected to a biasing resistor R17.

The third pulse transistor has a first secondary PT3–S1 in the stud control circuit with this secondary keying a fourth silicon controlled rectifier SCR4 which enables charged capacitors C15 and C16 to be connected back across the second silicon controlled rectifier SCR2 and cause it to turn off. This de-energizes the welding tool coil C so that the stud begins to plunge toward the workpiece under the influence of the plunger spring.

The third pulse transformer has a second secondary winding PT3–S2 in the synchronizing circuit which causes another portion of the synchronizing circuit to be operative. The secondary, when pulsed, keys a fifth silicon controlled rectifier SCR5 which is then held in through a resistor R18. A capacitor C17 then begins to charge at a rate determined by a second variable resistor VR2 and a fixed limiting resistor R19. When the charge on this capacitor reaches a predetermined value, a fourth unijunction transistor U4 is keyed to pulse a primary PT4–P of a fourth pulse transformer. A secondary PT4–S of this transformer is located in the main welding circuit and, when pulsed, fires a silicon controlled rectifier SCR–W for the main welding current. The capacitor K is thereby connected across the stud and the workpiece to initiate a welding arc between the two. A variable resistor VR3 across the primary PT4–P serves to calibrate and control the firing voltage of the unijunction transistor U4, along with a biasing resistor R20. Both variable resistors VR2 and VR3 thereby are effective to adjust the timing of the main welding arc. When the capacitor K is discharged and the stud has contacted the workpiece the welding cycle is completed.

While from the above, the initiation of the main welding arc will begin after the welding tool coil C is de-energized, this may vary from one type of tool to another. Further, there is a slight delay between the de-energization of the coil C and the actual beginning of the plunge stroke as effected by the plunge spring, so that the delay between the actual beginning of the plunge stroke and the initiation of the main welding arc may not be as much as the delay built into the circuitry due to the time required to key the unijunction transistor U4. In some instances, it may be desirable to initiate the welding arc prior to the de-energization of the coil C, or to produce both simultaneously, as discussed in my aforementioned patent application. Although there can be a variation in the timing of the coil and main welding, depending upon the application, it is important in all instances that the main power source be disconnected from the capacitor K prior to the initiation of the main welding arc.

The voltage regulating circuit is similar to that shown in my co-pending application Ser. No. 448,737, and will be discussed briefly. The voltage regulation causes the charging voltage to be increased at a progressively increasing rate until a maximum current is reached and also limits maximum current to a safe value in the event of a short circuit in the capacitor K. A source of power is provided by the secondary windings PS–2 of the main power source, and a full-wave rectifier bridge RB2 having two silicon controlled rectifiers designated SCR6a and SCR6b in output legs thereof. Power also is taken off the output legs ahead of the rectifiers SCR6a and SCR6b so that power can be supplied to certain portions of the circuit regardless of the conditions of these rectifiers. A Zener diode ZD1 provides a constant source of voltage across a primary PT5–P of a fifth pulse transformer connected with a fifth unijunction transistor U5 and a biasing resistor R21 with the capacitor C12 being connected to the emitter of the unijunction transistor. The capacitor C12 is charged at a rate determined by a resistor R22. When the charge on the capacitor C12 reaches a predetermined value, causing the unijunction transistor U5 to conduct, the capacitor C12 discharges through the primary winding PT5–P and induces pulses in the secondary windings PT5–S1 and PT5–S2 to fire one of the rectifiers SCR6a and SCR6b. A circuit is then completed to the capacitor K at a particular point in the half-wave cycle.

The rectifiers and the transformer PT5 are keyed and pulsed earlier in each half-wave by virtue of the additional capacitor C13 in parallel with the capacitor C12 and connected through a resistor R23. At the beginning of a charging cycle, with both capacitors C12 and C13 discharged, the capacitor V12 charges at its slowest rate since a large part of the current is diverted to the capacitor C13 through the resistor R23. Both of the capacitors C12 and C13 of course, are discharged completely at the end of the cycle through the transistor T2.

At the end of each half-wave cycle, the capacitor C12 is discharged but the capacitor C13 retains its charge, being prevented from discharging by a diode D5. Hence, the charge on the capacitor C13 builds up slightly more during each half-wave cycle, so that more current is directed to the capacitor C12, thereby charging faster and causing the rectifier SCR6a and SCR6b to fire earlier in the cycle.

Before the charge on the capacitor C12 and C13 will be equal, the circuit is designed so that the rectifiers SCR6a and SCR6b are keyed sufficiently early in the cycle that the voltage across the main leads exceeds the voltage across the Zener diode ZD1 with the capacitor C12 then charged through a resistor R24, a diode D6, and the resistor R23. Since this voltage is higher than that across the Zener diode, the capacitor C12 charges even faster to a point that the charge in the capacitor C13 reaches the firing voltage of the unijunction transistor U5 so that the capacitor C13 subsequently has little affect on the regulation of the voltage. When a predetermined output voatage is reached, as determined by a variable resistor VR4, the voltage is applied through the resistor VR4, and resistors R25, R26, and R27 through the base of a transistor T3. When the base voltage of the transistor T3 exceeds the emitter voltage thereof, set by a Zener diode ZD2, the transistor T3 starts to conduct and drains current through a resistor R28 from the capacitor C12, consequently increasing the time constant of this capacitor. Hence, the charge to the capacitor K is limited by the drain of the capacitor C12 with the charge on the capacitor K then being held substantially constant by the control achieved with the transistor T3.

As noted previously, when the transistor T2 conducts, the capacitor C13 discharges through a diode D7 along with the capacitor C12. A diode D8 prevents uncontrolled discharge of the capacitor C13 with the result that only one switching transistor, T2, can be employed for both of the capacitors C12 and C13. With these capacitors discharged, the voltage regulating circuit is ready for another cycle. The rectifiers SCR6a and SCR6b are off with the capacitors discharged so that the power source is isolated from the welding capacitor K when the transistor T2 conducts and a main welding arc persists.

To review the basic operation of the stud welding technique and circuitry, when the trigger T is pulled, the first pulse transformer causes the coil to be energized and the stud to be retracted from the workpiece. Simultaneously, the pilot arc circuit is closed to establish a pilot arc through the resistor PR and across the stud and workpiece. Even before the trigger was pulled, the voltage regulating circuit was connected to the main welding capacitor K and charged thereby. Consequently, with the pilot arc connected through the capacitor K and the main power source, the capacitor K will retain its full charge regardless of the duration of the pilot arc. Slightly after the first pulse transformer is pulsed, the transistor T1 is turned on to connect the synchronizing circuit. After a predetermined delay as adjusted by the variable resistor VR1, the silicon controlled rectifier SCR3 is keyed to begin charging the capacitor C10 which, when charged, energizes the primary PT2-P of the second pulse transformer. This causes the voltage regulating circuit to be disconnected from the capacitor K and the pilot arc means.

After another predetermined delay, by selection of the capacitors C14 and C10, the primary PT3-P of the third pulse transformer is pulsed to de-energize the coil C and to connect the capacitor C17 into the circuit to subsequently pulse the primary PT4-P of the fourth pulse transformer. This transformer then initiates the main welding arc by keying the rectifier SCR-W. This occurs after the voltage regulating circuit is isolated as determined by the time between the pulsing of the transformer primaries PT2-P and PT3-P added to the time delay between the pulsing of the transformer primaries PT3-P and PT4-P.

Referring now to the safety circuit, the voltage across the stud S and the workpiece P is sensed through the conductors 36 and 38, this voltage appearing across resistors R29 and R30 and a variable resistor VR5, in proportion to their values. A capacitor C18 charges to the voltage across the resistor R29 and fires a unijunction transistor U6 if the charge becomes sufficiently high. The unijunction transistor U6 then keys a silicon controlled rectifier SCR7 which remains keyed by a resistor R31. The rectifier SCR7 then shorts out a safety relay SR, which is the only non-solid state component in the entire circuitry. The higher voltage across the resistor R29 may occur, for example, if the rectifier SCR-P or SCR-W should fail. With the safety relay deenergized, the capacitor K discharges through a resistor R32 by the closing of contacts SR-1. Contacts SR-2 disconnect the capacitor K from the voltage regulating circuit. Contacts SR-3 turn off the voltage regulating circuit by discharging the capacitors C12 and C13, as an additional safety factor. Contacts SR-4 light an indicating lamp W. Contacts SR-5 in the safety circuit open to break a self-holding circuit established through a capacitor C19. When a reset trigger or button RT is closed, the capacitor C19, previously charged by the main power source, energizes relay SR which is then held in by its contacts SR-5. A resistor R33 limits the current across the relay SR. A diode D8 is for protection and prevents energy stored in the coil of the relay SR from being transmitted to the rectifier SCR7.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. Apparatus for welding a stud to a workpiece comprising a welding tool having means for retracting a stud and means for plunging the stud toward the workpiece; means providing a welding source of power, means for connecting said welding power source means, said stud, and said workpiece for establishing a pilot arc between said stud and said workpiece, means for determining the length of time said pilot arc connecting means is connected between said power source, said stud, and said workpiece to determine the duration of the pilot arc, a main source of power, means connecting said pilot arc connecting means to said main source of power in parallel with said welding source of power during at least a substantial portion of the duration of the pilot arc, means for subsequently disconnecting said main source of power and said welding source of power, and additional means for connecting only said welding power source means, said stud, and said workpiece to establish a main welding arc between said stud and said workpiece a predetermined time after said pilot arc is established.

2. Apparatus for welding a stud to a workpiece comprising a welding tool including electrical means for retracting a stud from the workpiece, means for plunging the stud toward the workpiece when said electrical means is energized and then de-energized, a main source of power, a capacitive power source for supplying welding arc current, means for establishing a pilot arc between the stud and the workpiece for a period of time and including said capacitive power source, means for supplying power from said main source to charge said capacitive power source and to supply power for said pilot arc means during at least a substantial portion of the time during which the pilot arc persists, and means for establishing a main welding arc after said pilot arc including means for connecting said capacitive power source, said stud, and said workpiece.

3. Apparatus for welding a stud to a workpiece comprising a welding tool including means for retracting a stud from the workpiece, means for plunging the stud toward the workpiece when said retracting means is energized and then de-energized, a main source of power, a capacitive welding source of power, means for connecting the welding power source, the stud, and the workpiece for establishing a pilot arc between the stud and the workpiece including means for adjusting the duration of the pilot arc, means for supplying power from said main source for charging said capacitive power source and for connecting said main source in parallel with said capacitive power source for supplying power for said pilot arc means during at least a substantial portion of the time during which the pilot arc persists, means for connecting said welding power source, said stud, and said workpiece for establishing a main welding arc between said stud and said workpiece, and means for disconnecting said welding power source from said main power source prior to establishing said main welding arc.

4. Apparatus for welding a stud to a workpiece comprising a welding tool including electrical means for retracting a stud from the workpiece, means for plunging the stud toward the workpiece after said stud retracting means is energized and then de-energized, a main source of power, a capacitive welding source of power, pilot arc circuit means including resistance means for connecting the capacitive power source, the stud and the workpiece for establishing a pilot arc between the stud and the workpiece, switch means in said pilot arc circuit means, welding arc circuit means for connecting the capacitive power source, the stud, and the workpiece for establishing a main welding arc between the stud and the workpiece, switch means in said welding arc circuit means, circuit means for connecting said main power source and said capacitive power source for charging said capacitive power source, means for closing said pilot arc switch means to establish the pilot arc with said circuit means connecting said main power source and said capacitive power source, means opening said circuit means between said capacitive power source and said main power source a predetermined period of time after said pilot arc switch means is closed, and means for closing said welding arc switch means a predetermined period of time after said pilot arc switch means is closed and after said circuit means is opened.

5. Apparatus for welding a stud to a workpiece comprising a main source of power, a capacitive welding source of power, pilot arc circuit means for connecting the capacitive power source, the stud, and the workpiece for establishing a pilot arc between the stud and the workpiece, semi-conductor switch means in said pilot arc circuit means, welding arc circuit means for connecting the capacitive power source, the stud, and the workpiece for establishing a main welding arc between the stud and the workpiece, semi-conductor switch means in said welding arc circuit means, voltage regulating circuit means for connecting said main power source and said capacitive power source to establish a predetermined charge on said capacitive power source, means for closing said pilot arc switch means to establish the pilot arc with said voltage regulating circuit means connecting said main power source and said capacitive power source, means isolating said voltage regulating circuit means from said capacitive power source a predetermined period of time after said pilot arc switch means is closed, and means for closing said welding arc switch means after said voltage regulating circuit means is isolated from said capacitive power source.

6. Apparatus for welding a stud to a workpiece comprising a welding tool including electrical means for retracting a stud from the workpiece, means for plunging the stud toward the workpiece after said stud retracting means is energized and then re-energized, a main source of power, a captive source of power, pilot arc circuit means including resistance means for connecting the capacitive power source, the stud, and the workpiece for establishing a pilot arc between the stud and the workpiece, switch means in said pilot arc circuit means, welding arc circuit means for connecting the capacitive power source, the stud, and the workpiece for establishing a main welding arc between the stud and the workpiece, switch means in said welding arc circuit means, voltage regulating circuit means for connecting said main power source and said capacitive power source to establish a predetermined charge on said capacitive power source, means for closing said pilot arc switch means to establish the pilot arc with said voltage regulating circuit means connecting said main power source and said capacitive power source, means isolating said voltage regulating circuit means from said capacitive power source a predetermined period of time after said pilot arc switch means is closed, and means for closing said welding arc switch means a predetermined period of time after said pilot arc switch means is closed and after said voltage regulating circuit means is isolated from said capacitive power source.

7. Apparatus for welding a stud to a workpiece comprising a welding tool including means for retracting a stud from the workpiece, means for plunging the stud toward the workpiece, a main source of power, a capacitive welding source of power, pilot arc circuit means for connecting the welding power source, the stud, and the workpiece for establishing a pilot arc between the stud and the workpiece, switch means in said pilot arc circuit means, welding arc circuit means for connecting the welding power source, the stud, and the workpiece for establishing a main welding arc between the stud and the workpiece, switch means in said welding arc circuit means, voltage regulating circuit means for connecting said main power source and said capacitive welding power source to establish a predetermined charge on said capacitive power source, manually-operated switch means for initiating a welding cycle, first means energized by said manually-operated switch means for energizing said retracting means and for closing said switch means in said pilot arc circuit means, timing circuit means for controlling welding steps in the welding cycle, means energized by the closing of said manually-operated switch means for rendering the timing circuit means operative, time-delay means in said timing circuit means energized a predetermined period of time after the timing circuit means is rendered operative for isolating said voltage regulating circuit means from said capacitive welding source, adjustable means in said timing circuit means for controlling the predetermined period of said time-delay means, additional time-delay means in said timing circuit means energized after said time-delay means is energized for closing said switch means in said main welding circuit to establish a main welding arc between the stud and the workpiece.

8. Apparatus for welding a stud to a workpiece comprising a welding tool including electrical coil means for retracting a stud from the workpiece, resilient means for plunging the stud toward the workpiece after said coil means is energized and then deenergized, a main source of power, a capacitive welding source of power, pilot arc circuit means including resistance means for connecting the welding power source, the stud, and the workpiece for establishing a pilot arc between the stud and the workpiece, switch means in said pilot arc circuit means, welding arc circuit means for connecting the welding power source, the stud, and the workpiece for establishing a main welding arc between the stud and the workpiece, switch means in said welding arc circuit means, voltage regulating circuit means for connecting said main power source and said capacitive power source to establish a predetermined charge on said capacitive power source, manually-operated switch means for initiating a welding cycle, first means energized by said manually-operated switch means for energizing said electrical coil means and for closing said switch means in said pilot arc circuit means, timing circuit means for controlling welding steps in the welding cycle, transistor means energized by the closing of said manually-operated switch means for rendering the timing circuit means operative, a variable resistor in said timing circuit means, first time-delay means in said timing circuit means energized a predetermined period of time after the energizing of said transistor means as determined by said variable resistor, second time-delay means in said timing circuit means energized a predetermined period of time after said first time-delay means is energized for isolating said voltage regulating circuit means from said capacitive welding source, third time-delay means in said timing circuit means energized a predetermined period of time after said first time-delay means is energized and after said second time-delay means is energized for closing said switch means in said main welding circuit to establish a main welding arc between the stud and the workpiece.

9. Apparatus for welding a stud to a workpiece comprising a welding tool including an electrical coil for retracting a stud from the workpiece, resilient means for plunging the stud toward the workpiece when said coil is energized and then de-energized, a main source of power, a capacitive welding source of power, pilot arc circuit means including resistance means for connecting the welding power source, the stud, and the workpiece for establishing a pilot arc between the stud and the workpiece, semi-conductor rectifier means in said pilot arc circuit means, welding arc circuit means for connecting the welding power source, the stud, and the workpiece for establishing a main welding arc between the stud and the workpiece, second semi-conductor rectifier means in said welding arc circuit means, manually-operated switch means for initiating a welding cycle, voltage regulating circuit means for connecting said main power source and said capacitive welding power source to establish a predetermined charge on said capacitive power source, first means energized by said manually-operated switch means for energizing said electrical coil and for keying said rectifier means in said pilot arc circuit means, timing circuit means for controlling welding steps in the welding cycle, transistor means energized by the closing of said manually-operated switch means for rendering the timing circuit means operative, a variable resistor in said timing circuit means, first time-delay means in said timing circuit means energized a predetermined period of time after the energizing of said transistor means as determined by said variable resistor, second time-delay means in said timing circuit means energized a predetermined period of time after said first time-delay means is energized for isolating said voltage regulating circuit means from said capacitive welding source, third time-delay means in said timing circuit means energized a predetermined period of time after said first time-delay means is energized and after said second time-delay means is energized for de-energizing said electrical coil and for keying said rectifier means in said main welding circuit to establish a main welding arc between the stud and the workpiece.

10. A method for welding a stud to a workpiece comprising providing a main power source and a capacitive power source, retracting the stud a predetermined distance from the workpiece after touching the stud to the workpiece, establishing a pilot arc between the stud and the workpiece by connecting said power sources to said stud and said workpiece through an impedance and a resistance, disconnecting said main power source from said stud and said workpiece a period of time after said pilot arc is established, subsequently establishing a main welding arc between said stud and said workpiece by connecting only said capacitive power source between said stud and said workpiece through said impedance without said resistance, and plunging said stud against said workpiece.

11. A method for welding a stud to a workpiece comprising providing a main power source and a second power source, holding the stud a predetermined distance from the workpiece, establishing a pilot arc between the stud and the workpiece by connecting both of said power sources in parallel to said stud and said workpiece, disconnecting said main power source from said stud and said workpiece a predetermined period of time after said pilot arc is established, subsequently establishing a main welding arc between said stud and said workpiece, and moving said stud against said workpiece.

References Cited

UNITED STATES PATENTS

| | | | |
|---|---|---|---|
| 3,114,827 | 12/1963 | Kelemen et al. | 219—99 |
| 3,250,891 | 5/1966 | Pease | 219—113 |
| 3,315,062 | 4/1967 | Pease | 219—113 |

FOREIGN PATENTS

| | | |
|---|---|---|
| 954,458 | 4/1964 | Great Britain. |

RICHARD M. WOOD, *Primary Examiner.*

C. CHADD, *Assistant Examiner.*

UNITED STATES PATENT OFFICE
CERTIFICATE OF CORRECTION

Patent No. 3,414,700                                      December 3, 1968

Paul A. Glorioso

It is certified that error appears in the above identified patent and that said Letters Patent are hereby corrected as shown below:

Column 1, line 39, "No. 732,764" should read -- No. 372,764 --. Column 5, line 37, "plunger" should read -- plunge --. Column 6, line 38, "V12" should read -- C12 --; line 50, "and" should read -- or --; line 64, "voatage" should read -- voltage --. Column 9, line 38, "re-energized" should read -- de-energized --; line 39, "captive" should read -- capacitive --; same line 39, "are" should read -- arc --; line 52, "are" should read -- arc --.

Signed and sealed this 10th day of March 1970.

(SEAL)
Attest:

Edward M. Fletcher, Jr.                    WILLIAM E. SCHUYLER, JR.
Attesting Officer                              Commissioner of Patents